Patented Mar. 3, 1931

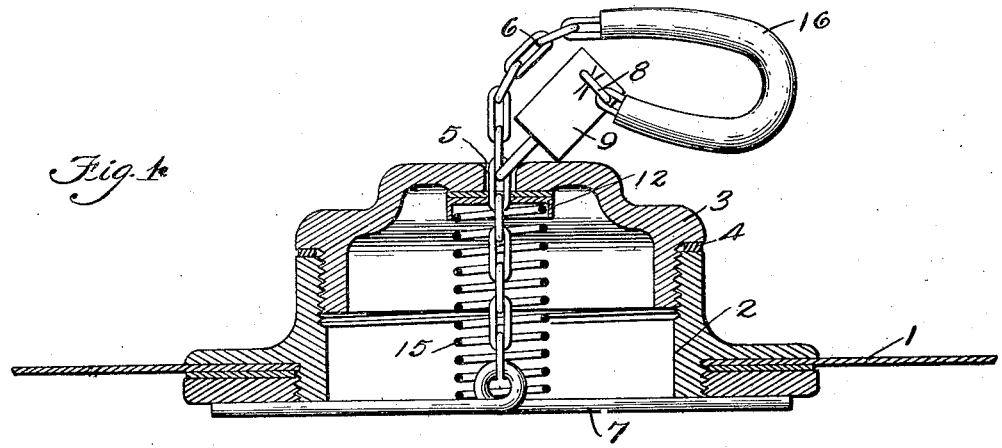
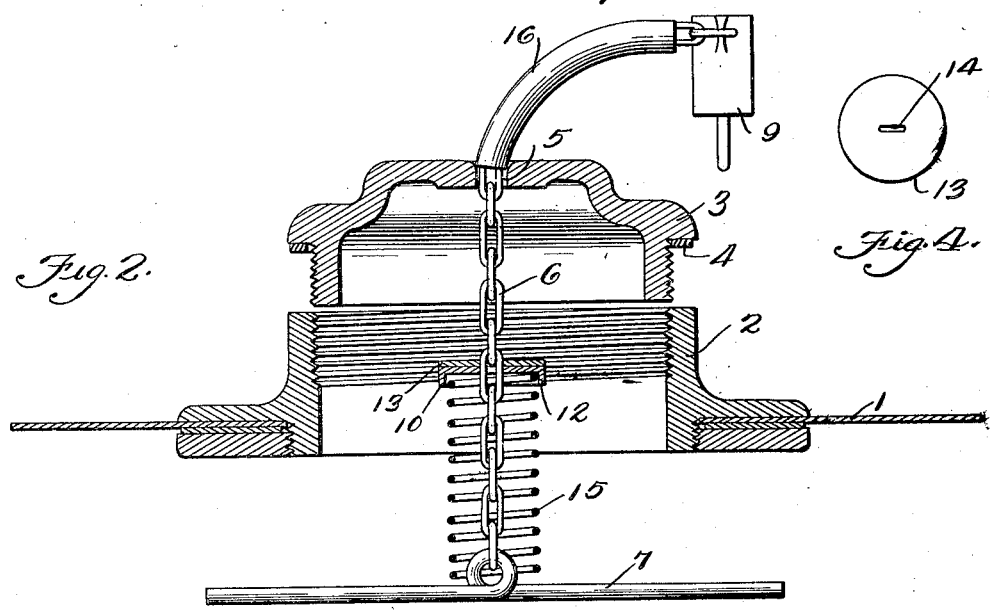
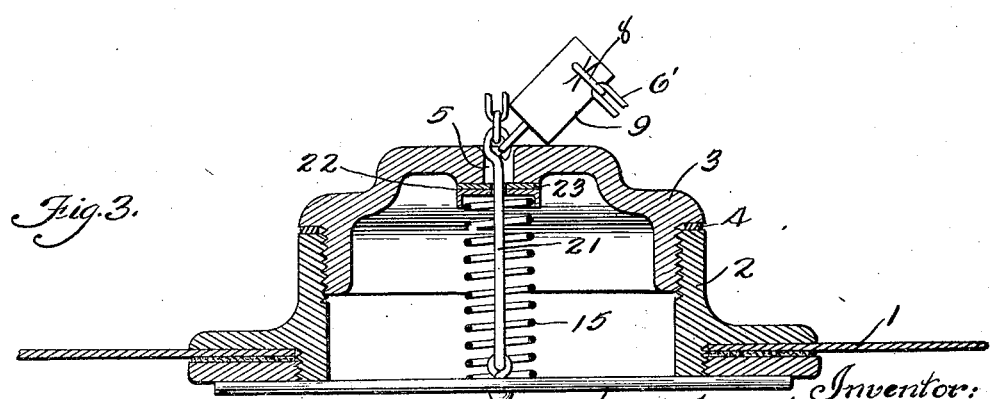

1,794,386

UNITED STATES PATENT OFFICE

ALEXANDER MILLER, OF DAVENPORT, IOWA, ASSIGNOR OF ONE-THIRD TO IGNATIUS IZSAK AND ONE-THIRD TO STEVE RIMAN, BOTH OF CHICAGO, ILLINOIS

TANK-CAP-LOCKING MEANS

Application filed August 30, 1928. Serial No. 302,962.

The invention relates to improvements in closure and locking arrangements for tanks and like receptacles, and has a special relation to a novel and improved locking means for gasolene tanks used on automotive vehicles and the like.

The main object of the invention is to provide simple and efficient means for preventing the unauthorized removal of removable caps or stoppers such as those used in connection with tanks, and the like of automobiles and similar vehicles and with reference to which the caps or stoppers must be removed from time to time to permit the refilling or recharging of said tank.

Another object of the invention is to provide a novel and improved means for attaching and locking a cap or stopper such as that used in connection with a tank, and the like of an automobile and similar vehicle, in a novel relation so that the cap or stopper is at all times connected to the tank, but may be moved therefrom for the purpose of refilling or recharging the tank, and embodying a novel and simplified method of locking the cap or stopper on the tank, to prevent the unauthorized removal of said cap and protect the contents of said tank from being stolen.

A further object of the invention is to provide a novel and improved means adapted for association with a removable cap or stopper such as that used in connection with a tank, and the like of an automobile and similar vehicle, for locking the said cap to the tank to prevent the unauthorized removal of said cap and protect the contents of the said tank from being stolen, said means comprising a flexible element such as a chain, or the like, extending through the cap which may be of ordinary construction, said element being provided with a cross rod extending into the tank and engaging the walls thereof, and a locking means connected to the other end of the element on the outside of said tank, said locking means being adapted to engage an intermediate portion of the element or chain after the cap has been moved to closing position for preventing the removal of said cap without first unlocking the said locking means.

A still further object of the invention is to provide a means for attaching and locking a closure upon a gasolene tank, or the like, in a novel relation so that the closure is at all times connected to the tank, but may be moved therefrom for the purpose of refilling the same, said means comprising a link chain, or the like, extending through an opening provided therefor in the closure which may be of ordinary construction, one end of the chain extending into the tank and having a cross rod secured thereto, the length of said cross rod being greater than the diameter of the filling opening of the tank, and the other end of the chain extending on the outside of the tank and having a lock secured thereto, said lock being adapted for engaging a link of said chain after the closure has been moved to closed position for preventing the unauthorized removal of said closure, and means associated with said chain for preventing the spilling or evaporation of the contents of said tank through the opening provided for the chain in the closure.

A still further object of the invention is to provide a device of the character described which may be easily and readily installed on a tank of the character described without modifying or altering the construction of the same or the vehicle on which the tank is mounted.

A still further object of the invention is to provide a device of the character described which will be compact, simple in construction, easily installed, and efficient in carrying out the purposes for which it is designed.

With the foregoing and other objects in view, which will appear as the description proceeds, the invention consists in certain novel features of construction, arrangement, and combination of parts, hereinafter more fully described, illustrated in the accompanying drawings, and particularly pointed out in the appended claims.

It is to be understood that various changes in the form, proportion, size, and minor details of the structure may be made without departing from the spirit or sacrificing any of the advantages of the invention.

Stated generally, the invention comprises a flexible element such as a link chain, or the like, the said chain extending through a central opening provided therefor in the cap or stopper of a gasolene tank, such as that used in connection with automobiles or similar vehicles. The end of the chain extending into the tank has pivotally secured thereto a cross rod which is somewhat longer than the diameter of the filling opening of the tank, and which is adapted, when in assembled position, to engage the portion of the inner top wall of the tank surrounding the filler opening, thus making it impossible to remove the cross rod from the tank without first tipping the said rod on end. The end of the chain extending on the outside of the tank has secured thereto a lock, or the like, which lock is adapted to engage in one of the intermediate links of the chain after the said cap has been moved to closed position for preventing the unauthorized removal of the cap. In order to prevent the evaporation or spilling of gasolene through the central opening in the cap, a washer of suitable material is mounted on the chain on the inside of the cap, said washer being forced against the opening by a suitable spiral spring mounted on the chain, and acting between the washer and the cross rod. When the lock is removed from engagement with the intermediate portion of the chain, the cap may be unscrewed and moved a sufficient distance to permit the refilling of the tank.

For the purpose of facilitating an understanding of my invention I have illustrated in the accompanying drawing preferred embodiments thereof, from an inspection of which, when considered in connection with the following description, my invention, its mode of operation, assembly, and many of its advantages should be readily understood and appreciated.

Referring to the drawings, in which similar characters of reference are employed to indicate corresponding or similar parts throughout the several figures in the drawings:—

Figure 1, is a transverse sectional view of the top portion of a tank of the type ordinarily employed as a reservoir for gasolene or other fuel and a cap fitted thereto, and an embodiment of the invention associated therewith in a connecting and locking arrangement;

Figure 2, is a transverse sectional view of the top portion of the tank, showing the manner in which the cap may be readily detached from the tank after the same has been unlocked;

Figure 3, is a view similar to Fig. 1, showing a modified form of the invention; and Figure 4, is a detail plan view of a washer element.

Referring to the drawings more specifically, the reference character 1, designates a tank of the type ordinarily employed as a reservoir for gasolene or other fuel, used on automobiles or similar vehicles. The said tank is provided with a suitable filler opening 2, which is internally threaded for receiving the cap or stopper 3, which may be of ordinary and usual construction. A suitable gasket or packing ring 4, may be used for providing a good seal for the filler opening when the cap is screwed down to a fully closed position. The parts above mentioned are of well known and standard construction, and form no part of the present invention.

As shown in the drawings, the removable cap 3, is provided with a central opening 5, in the top thereof, and through which opening is adapted to extend a flexible element 6, such as a chain of the link-type, or the like, the said flexible element 6, having one end thereof extending into the tank 1, and has flexibly connected therewith a limiting element 7, consisting in the construction illustrated of a bar or rod of a length greater than the diameter of the filler opening 2, in which the cap or stopper 3, is seated, and which therefore is adapted to bear terminally against the wall or top of the tank 1, in spanning relation with the said opening, when the locking means is in operative arrangement on the tank.

To the other end of the flexible element 6, which extends on the outside of the tank, is secured in any suitable and well known manner, such as by the staple 8, a suitable padlock 9, said padlock being of such a size as to be adapted for engagement within any of the links of the chain 6, for the purpose of locking the cap to the tank, making it impossible to unscrew the said cap without first removing the lock from engagement with one of the intermediate links of the chain. Obviously, the opening 5, provided in the cap 3, is of sufficient size to permit the ready and easy passage of the chain therethrough.

In order to prevent the spilling or evaporation of fuel through the opening 5, in the cap, I provide the following means which is adapted to fully close the said opening and to maintain the same closed as long as the lock is in operative arrangement on the cap, as shown in Figure 1. Mounted on the chain 6, intermediate the ends thereof and disposed on the inside of the cap 3, is a suitable disc-like member 10, said member being of metal or the like, and is provided with a central opening, through which the chain 6, is adapted to pass freely, and a depending annular flange 12, for a purpose to be presently described.

To the top face of the member 10, is secured or attached in any suitable manner, such as by glue or the like, a flexible washer 13, said washer being made of leather or other suitable material, and is provided with an elongated opening 14, which is adapted to register with the opening 11, in the member 10. The opening 14, is of such a size and shape as to be adapted to permit the forcing of the passage of the chain 6, therethrough, but will cause the washer 13 to be frictionally held on any one of the links, after it has been moved to any desired position on the chain. A spiral spring 15, surrounding the chain 6, is provided between the member 10, and the rod 7, the said spring having the upper end thereof received in the recess of the member 10, formed by the depending flange 12, the spring being adapted to force the member 10 and washer 13, upwardly to bear against the inside top wall of the cap 3, when the latter is seated in the opening 2, and the padlock 9, has been moved to locking position in one of the links of the chain, as shown in Figure 1, of the drawings. The spring 15, also has the added function of preventing any rattling sound that might be caused by the ends of the rod 7, hitting against the wall of the tank.

The mechanism is adapted for attachment to any tank having a removable cap by merely providing a suitable central opening in the top thereof for the ready passage of the chain therethrough. The chain 6, is then passed through the opening and the member 10, with the washer 13, secured thereto is mounted on the chain by forcing the links of the chain through the opening 14, in the washer, until the washer is disposed on the desired link of the chain, that link being the one which will receive the padlock 9, when the device is in locking arrangement with the cap 3. The spiral spring 15, is then mounted on the end of the chain adjacent the member 10, one end of the spring being received in the recess of the said member, and the free end of the chain is then secured in any suitable manner to the rod 7, intermediate the ends thereof.

To the other free end of the chain is now secured the padlock 9, by means of the staple 8, provided on the lock for that purpose. The mechanism is now fully assembled and is ready for insertion into the tank. The rod or limiting element 7, may now be inserted longitudinally into the tank through the filler opening 2, wherein it will assume a substantially horizontal position, spanning the said opening.

When the device is in locked position on the tank, as shown in Figure 1, it will be noted that it is impossible to remove or unscrew the cap 3, without first removing the padlock from engagement with the link of the chain in which it is received. It will also be noted that when in this position the opening 5, in the cap is fully closed by the washer 13, thereby avoiding the possibility of spilling or evaporation of the fuel from the tank. When it is desired to refill the tank, the padlock is unlocked and removed from engagement with the link in which it is received, the device or mechanism will then assume the position shown in Figure 2, at which time the cap may be unscrewed and moved a sufficient distance away from the filler opening to permit the refilling of the tank, the chain being of sufficient length to permit this. It will also be noted that since the padlock is secured to the end of the chain it will be impossible for the chain to fall into the tank, or for the cap to be lost or misplaced. When the tank has been filled the cap may be again seated in the filler opening and the chain pulled up through the opening 5, until the rod 7, is brought into engagement with the top wall of the tank and the padlock secured in the link of the chain projecting just beyond the top of the cap.

In the modified form illustrated in Figure 3, of the drawings, the limiting element 20, is pivotally secured to one end of a rod or bar 21, having an eye at each end thereof, the other end of the rod has secured thereto one end of a chain 6', of the link type, the other end of said chain having attached thereto a padlock 9, by means of a staple 8, secured to the lock. The chain and rod 21, are adapted to be extended through the opening provided therefor in the cap 3, and the rod 21, is adapted to receive thereon intermediate the ends thereof, a member 22, having a depending flange at the bottom, and a leather washer 23 attached to the top face thereof. Interposed between the member 22, and the limiting member or rod 21, is a spiral spring 15, the action of said spring being the same as that in the embodiment of the invention illustrated in Figs. 1 and 2. The operation and assembly of the mechanism is the same as that hereinbefore described in connection with the other form.

In order that the vibration of the flexible element or chain 6 or 6', may not by contact with the sides of the tank cause a rattling sound which might prove annoying to the occupants of the car equipped with the mechanism, a suitable covering 16, of leather or the like, is provided for a portion of the chain adjacent the end to which the padlock 9, is secured.

Although the mechanism has been illustrated in connection with one form of tank construction, it is to be understood that my invention is suitable for use with all tanks comprising a removable cap, and that this invention is adapted for use with a wide variety of tanks falling within the above description.

It is believed that my invention, its mode of construction, and many of its advantages should be readily understood from the foregoing without further description, and should also be manifest that while two preferred embodiments of the invention have been shown and described for illustrative purposes, the structural details are nevertheless capable of wide variation within the purview of my invention, as defined in the appended claims.

What I claim and desire to secure by Letters Patent of the United States is:—

1. A device of the character described for locking removable caps to their tanks comprising a flexible element extending through the said cap, a limiting element longitudinally insertable through the opening fitted with said cap but of a length greater than the diameter of the said opening, said element being secured to one end of said flexible element, and a lock secured to the other end of said flexible element adapted for engagement with an intermediate portion of said flexible element.

2. In a device of the character described, the combination with a tank having a removable cap fitted therein, of a flexible element extending through said cap, a limiting element secured on one end of said flexible element, a padlock secured on the other end of said flexible element, and means provided on said flexible element for receiving in locking engagement therewith the said padlock.

3. In a device of the character described, the combination with a tank having a removable cap fitted therein, said cap having an opening provided therein, a flexible element extending through said opening and having a limiting element secured to one end thereof, a padlock secured to the other end of said flexible element adapted for engagement with an intermediate portion of said flexible element, and means mounted on said flexible element for closing the opening in said cap.

4. In a device of the character described, the combination with a tank having a removable cap fitted therein, said cap having an opening provided therein, a flexible element extending through said opening, a limiting element secured to one end of said flexible element, a padlock secured to the other end of said flexible element adapted for locking engagement with a portion of said flexible element intermediate the ends thereof, means mounted on said flexible element for closing the opening in said cap, and a resilient means mounted between said limiting element and the first mentioned means.

5. In a device of the character described, the combination of a tank having a removable cap fitted therein, said cap having an opening provided therein in the top thereof, and a flexible element extending through said cap and having a limiting element secured to one end thereof and a padlock secured to the other end thereof, said padlock being adapted for engagement with an intermediate portion of said flexible element for locking the cap to said tank, means mounted on said flexible element for closing the opening in said cap, and a spiral spring surrounding said flexible element disposed between said cap opening closing means and the limiting element, said spring being insured against displacement on said flexible element.

6. In a device of the character described, the combination of a tank having a removable cap fitted therein, said cap having an opening provided therein, and a flexible element extending through said opening, a limiting element longitudinally insertable into the tank pivotally secured to one end of said flexible element, a padlock secured to the other end of said flexible element adapted for engagement with a portion of said flexible element intermediate the ends thereof, means frictionally held on said flexible element for closing the opening in said cap, resilient means surrounding said flexible element for forcing the said means against the said opening to close the same, and means provided on said first mentioned means for preventing the displacement of said resilient means.

In testimony whereof I affix my signature.

ALEXANDER MILLER.